United States Patent
Klemm et al.

(10) Patent No.: US 8,499,658 B2
(45) Date of Patent: Aug. 6, 2013

(54) TRANSFER CASE FOR A VEHICLE

(75) Inventors: Laura Klemm, Shelby Township, MI (US); Todd R. Ekonen, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 197 days.

(21) Appl. No.: 13/212,739

(22) Filed: Aug. 18, 2011

(65) Prior Publication Data

US 2013/0042721 A1 Feb. 21, 2013

(51) Int. Cl.
*F16H 3/16* (2006.01)

(52) U.S. Cl.
USPC .............. 74/377; 74/375; 74/361; 74/665 GA

(58) Field of Classification Search
USPC .................... 74/665 GA, 369, 371, 372, 375, 74/376, 377
See application file for complete search history.

(56) References Cited

U.S. PATENT DOCUMENTS

| | | | |
|---|---|---|---|
| 2,219,249 A | 10/1940 | Blagden et al. | |
| 2,851,115 A | 9/1958 | Buckendale | |
| 2,946,238 A | 7/1960 | Beyerstedt | |
| 4,809,560 A * | 3/1989 | Nemoto | 74/371 |
| 5,135,071 A * | 8/1992 | Shibahata et al. | 180/249 |
| 5,885,182 A | 3/1999 | Forsyth | |
| 5,951,430 A * | 9/1999 | Kobayashi | 475/221 |
| 6,176,359 B1 | 1/2001 | Krisher | |
| 6,830,142 B2 * | 12/2004 | Weilant | 192/84.92 |

FOREIGN PATENT DOCUMENTS

EP 2228249 A1 9/2010

OTHER PUBLICATIONS

European Patent Office; Search Report; Jan. 2, 2013; 5 Pages; Munich Germany.

* cited by examiner

*Primary Examiner* — Ha D Ho
(74) *Attorney, Agent, or Firm* — Brooks Kushman P.C.

(57) ABSTRACT

A transfer case for a vehicle. The transfer case may include a rotation direction portion and an output mode portion configured to be driven by the rotation direction portion. The rotation direction portion may provide torque in different directions to the output mode portion. The output mode portion may selectively provide output torque to one or more outputs.

20 Claims, 6 Drawing Sheets

TRANSFER CASE FOR A VEHICLE

TECHNICAL FIELD

The present application relates to a transfer case that may be provided with a vehicle.

BACKGROUND

A bidirectional overrunning clutch that can be used in a powertrain design having a transfer case is disclosed in U.S. Pat. No. 6,176,359.

SUMMARY

In at least one embodiment a transfer case is provided. The transfer case may include a rotation direction portion and an output mode portion. The rotation direction portion may have an input shaft configured to receive an input torque, first and second gear sets selectively coupled to the input shaft, and a gear set selector unit. The gear set selector unit may be configured to move between a forward position in which torque is transmitted through the first gear set and a reverse position in which torque is transmitted through the second gear set. The output mode portion may be configured to be driven by the rotation direction portion. The output mode portion may have first and second outputs and a mode selector unit configured to move between a first position and a second position. Torque may be transferred to the first and second outputs when the mode selector unit is in the second position.

In at least one embodiment a transfer case for a vehicle is provided. The transfer case may include a rotation direction portion and an output mode portion. The rotation direction portion may have an input shaft, first and second gear sets, and a gear set selector unit. The input shaft may be configured to receive an input torque from a transmission. The gear set selector unit may move between a forward position in which torque is transmitted through the first gear set and a reverse position in which torque is transmitted through the second gear set. The output mode portion may by driven by the rotation direction portion. The output mode portion may have first and second outputs configured to provide torque to first and second traction wheel sets, respectively, and a mode selector unit. The mode selector unit may be configured to move between a first position and a second position. Torque may be transferred from the rotation direction portion to the output mode portion in a first rotational direction when the gear set selector unit is in the forward position and in a second rotational direction when the gear set selector unit is in the reverse position. Torque may be transferred to the first output but not the second output when the mode selector unit is in the first position and the first and second outputs when the mode selector unit is in the second position.

In at least one embodiment a transfer case is provided. The transfer case may include a first shaft, a second shaft, first and second gear sets, a differential, and a connection output shaft. The first shaft may receive an input torque and may rotate about a first axis of rotation. The second shaft may rotate about a second axis of rotation. The first and second gear sets may selectively couple the first shaft and the second shaft. The first and second shafts may rotate in different directions when the first shaft drives the first gear set and may rotate in the same direction when the first shaft drives the second gear set. The differential may be driven by the second shaft and may have first and second differential output shafts. The connection output shaft may be selectively coupled to the second differential output shaft. The second differential output shaft rotates the connection output shaft when coupled and does not rotate the connection output shaft when not coupled.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
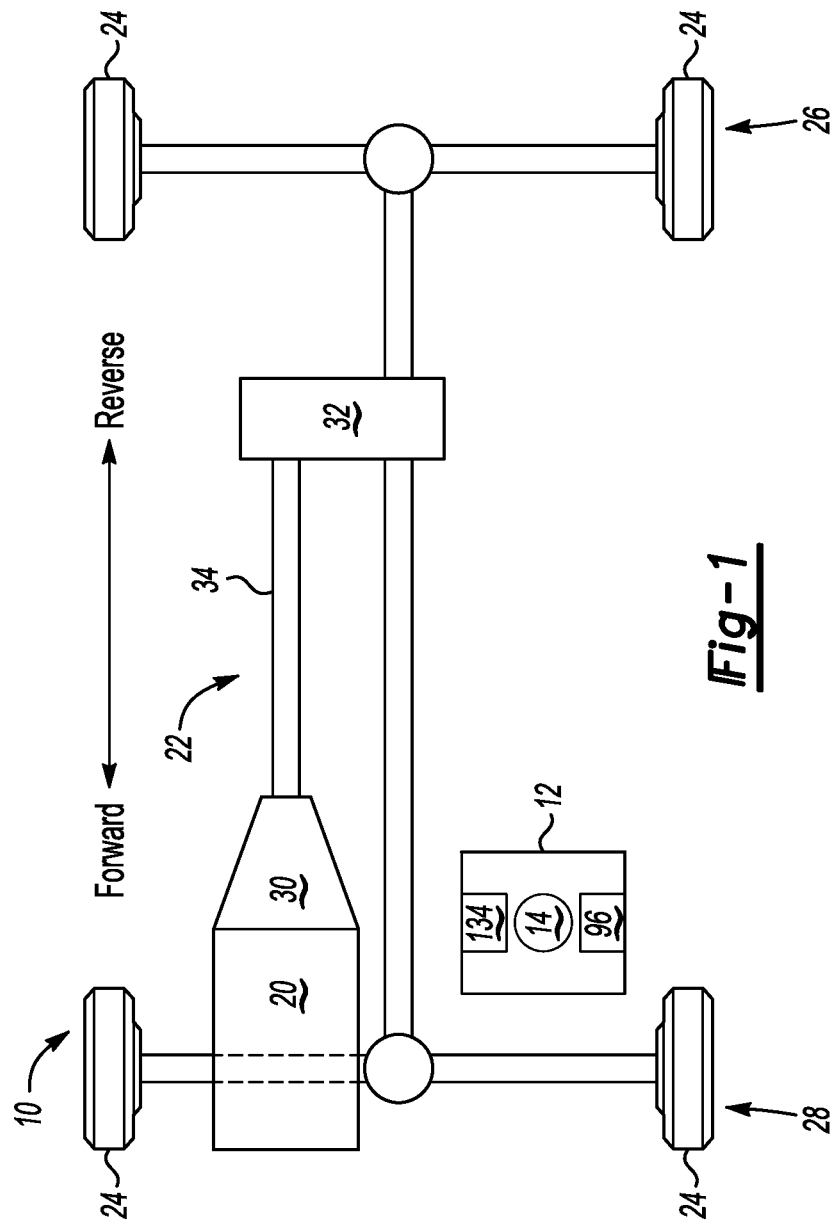
FIG. 1 is a schematic of an exemplary vehicle having a transfer case.

Referring to FIG. 1, an exemplary vehicle 10 is shown. The vehicle 10 may be a motor vehicle, such as a truck, military transport or weaponry vehicle, farm equipment, material handling vehicle, or a cargo or container loader for air, land, or marine vessels. Such a vehicle may also have a "flip cab" configuration in which the cab 12 in which the driver 14 sits or a portion thereof may "flip" or rotate between forward and reverse or rearward facing directions when the vehicle is in a forward gear and a reverse gear, respectively, so that the driver 14 is oriented in a direction of travel. The vehicle 10 may include one or more power sources 20 and a drivetrain 22.

The power source 20 may provide power that may be used to rotate one or more traction wheels 24. In FIG. 1, a single power source 20 is shown that may be configured as an internal combustion engine that may be adapted to combust any suitable type of fuel, such as gasoline, diesel fuel, or hydrogen. Alternatively, multiple power sources could be provided, such as may be employed with a hybrid vehicle. In such an embodiment, a power source could be an electric power source, such as a battery, capacitor, or fuel cell, or a non-electric power source, such as a hydraulic power source.

The drivetrain 22 may be driven or powered by one or more power sources 20 to provide torque to one or more traction wheels 24. The traction wheels 24 may be associated with one or more traction wheel sets, such as a first traction wheel set 26 and a second traction wheel set 28. The drivetrain 22 may include a transmission 30 and a transfer case 32 that may be spaced apart from the transmission 30. The power source 20 may be coupled to the input of the transmission 30. An output of the transmission 30, such as an output shaft 34, may be coupled to an input of the transfer case 32. One or more outputs of the transfer case 32 may be coupled to one or more sets of vehicle traction wheels 24. As such, the transfer case 32 may provide torque to a single set of vehicle traction wheels 24 or multiple sets of vehicle traction wheels 24 to provide a multi-wheel or all-wheel drive (AWD) operation mode.

In at least one embodiment, the transmission 30 may have a plurality of gear ratios and may rotate the output shaft 34 in a single rotational direction. For instance, the transmission 30 may be configured without a reverse gear ratio or the reverse gear ratio may not be engaged during normal operation. The transfer case 32 may provide reverse gear functionality. For example, the output of the transfer case 32 may reverse the rotational output of the transmission 30 to propel the vehicle 10 in a reverse direction. In addition, the output of the transfer case 32 may rotate in the same direction as the output of the transmission 30 to propel the vehicle 10 in a forward direction. As such, the multiple gear ratios of the transmission 30 may be utilized to propel the vehicle 10 in both the forward and reverse directions rather than a single reverse gear ratio. In various embodiments, the forward and reverse gear ratios may be the same or different.

Figure 2:
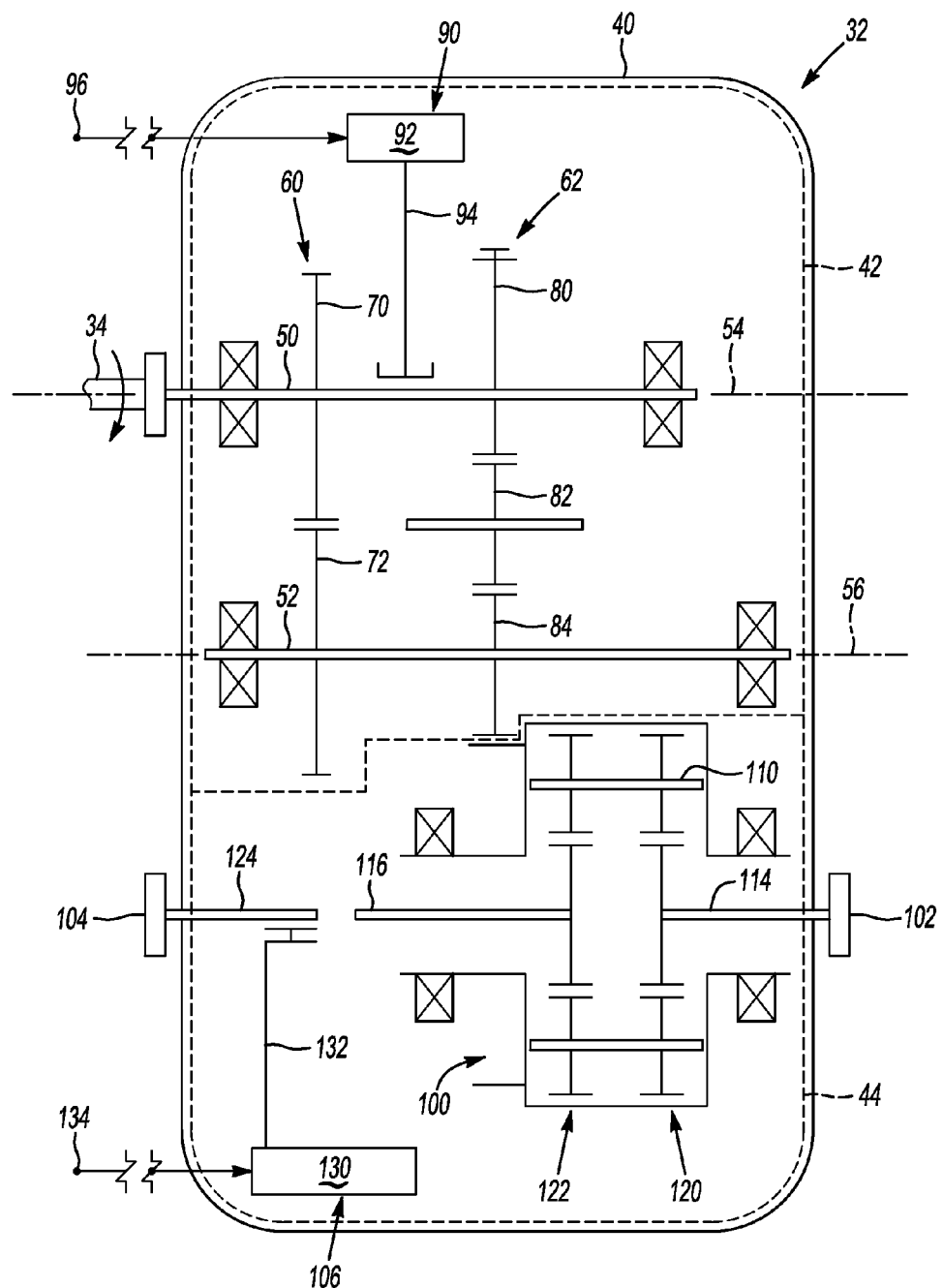
FIG. 2 is a schematic of the transfer case in a neutral operation mode.

Referring to FIG. 2, an embodiment of a transfer case 32 is shown in more detail. The transfer case 32 may include a housing 40, a rotation direction portion 42, and an output mode portion 44.

The housing 40 may be provided to receive various components of the transfer case 32. In addition, the housing 40 may facilitate mounting of the transfer case 32 to the vehicle 10.

The rotation direction portion 42 may be configured to transfer torque from the transmission 30 to the output mode portion 44 in a desired rotational direction. The rotation direction portion 42 may include an input shaft or first shaft 50 and a second shaft 52. The first shaft 50 and the second shaft 52 may be rotatably disposed on the housing 40, such as with bearings. The first shaft 50 may be coupled to the output shaft 34 of the transmission 30 and may be configured to rotate about a first axis of rotation 54. The second shaft 52 may be spaced apart from the first shaft 50 and may be configured to rotate about a second axis of rotation 56. The first shaft 50 and output shaft 34 may be coupled with the same or different gear ratios or gear reduction. For instance, the output shaft 34 may be directly coupled to the first shaft 50. Alternatively, a planetary gear set may be provided between the output shaft 34 and first shaft 50 to provide different gear ratios. In addition, synchronized shifting is also possible with the addition of synchronizers.

The first shaft 50 and second shaft 52 may rotate in the same or different directions. For instance, the first shaft 50 and second shaft 52 may rotate in different or opposite directions when a forward direction of travel is desired and may rotate in the same direction when a reverse direction of travel is desired. The direction of travel may be based on the selection or engagement of a gear set that is associated with the first and second shafts 50, 52. For example, a first gear set 60 may be selected or engaged when a forward direction of travel is desired and a second gear set 62 may be selected or engaged when a reverse direction of travel is desired.

The first gear set 60 may include a first gear 70 and a second gear 72. The first gear 70 may be driven or rotated by the first shaft 50. The second gear 72 may be fixedly disposed on the second shaft 52 and may mesh with and be driven by the first gear 70.

The second gear set 62 may include a third gear 80, an idler gear 82, and a fourth gear 84. The third gear 80 may be driven or rotated by the first shaft 50. The idler gear 82 may mesh with and be driven by the third gear 80. The fourth gear 84 may be fixedly disposed on the second shaft 52 and may mesh with and be driven by the idler gear 82. The fourth gear 84 may couple the rotation direction portion 42 to the output mode portion 44.

A gear set selector unit 90 may be provided to select and engage a desired gear set. No more than one gear set 60, 62 may be operationally engaged at a time. As such, either the first gear set 60, the second gear set 62, or neither gear set may transmit torque to the output mode portion 44 of the transfer case 32. The gear set selector unit 90 may include an actuator 92 and a linkage 94. The actuator 92 may be of any suitable type, such as mechanical, pneumatic, hydraulic, electrical, or electromechanical. Operation of the actuator 92 may be based on an input or input signal from a vehicle operator. For instance, a first input device 96, such as a shift lever or button, may be provided to allow a vehicle operator to select a desired direction of vehicle travel. A signal based on the status of the first input device 96 may then be communicated directly or indirectly to the actuator 92 to control operation of gear set selector unit 90. For instance, a control unit or controller may be provided to control operation of the actuator 92 or the supply of electrical current, pressurized fluid, or other force to operate the actuator 92. The actuator 92 may then actuate or position the linkage 94 in a neutral position, a forward position, or a reverse position as will be discussed in more detail below.

The output mode portion 44 may be configured to selectively couple the rotation direction portion 42 to one or more sets 26, 28 of traction wheels 24. The output mode portion 44 may include a differential 100, a first output 102, a second output 104, and a mode selector unit 106.

The differential 100 may be provided to allow vehicle traction wheels 24 or traction wheel sets 26, 28 to rotate at different speeds. The differential 100 may be of any suitable type. For instance, the differential 100 may be passive or active and may be based on any suitable gearing or coupling configuration, such as a planetary gear set or bevel gear configuration. In addition, the differential 100 may distribute torque between wheel sets 26, 28 in any suitable manner, such as a substantially equal or 50/50 split between first and second traction wheel sets 26, 28 or a dissimilar or adjustable torque distribution, such as may be provided with a torque biasing differential.

The differential 100 may be driven by the rotation direction portion 42. For instance, the differential 100 may include an input gear 110 that may be coupled to a housing of the differential 100 and that may mesh with the fourth gear 84. The input gear 110 may be operatively connected to the first and second differential output shafts 114, 116. The connection between the input gear 110 and first and second differential output shafts 114, 116 may vary depending on the configuration of the differential 100. In the embodiment shown, a first and second differential gear sets 120, 122 are provided for coupling the input gear 110 and the differential housing to the first and second differential output shafts 114, 116, respectively.

The first differential output shaft 114 may be coupled to a first traction wheel or first traction wheel set 26, which may provide rear wheel drive in one or more embodiments. The first differential output shaft 114 may be continuously coupled to the first traction wheel set 26 such that torque is transmitted from the transmission 30 to the first traction wheel set 26 via the differential 100 when the rotation direction portion 42 is not in a neutral position as will be discussed in more detail below.

The second differential output shaft 116 may be selectively coupled to a second traction wheel or second traction wheel set 28, which may provide front wheel drive in one or more embodiments. The second differential output shaft 116 may be selectively coupled to the second output 104 and a connection output shaft 124 via the mode selector unit 106.

The mode selector unit 106 may selectively couple or disconnect the second differential output shaft 116 and the connection output shaft 124. In at least one embodiment, the second differential output shaft 116 and connection output shaft 124 may be rotatably disposed along a common axis of rotation.

The mode selector unit 106 may include an actuator 130 and a linkage 132. The actuator 130 may be of any suitable type, such as mechanical, pneumatic, hydraulic, electrical, or electromechanical. Operation of the actuator 130 may be based on an input or input signal from a vehicle operator or from a control module or control system. For instance, a second input device 134, such as a shift lever or button, may be provided to allow a vehicle operator to engage one wheel set or multiple wheel sets. A signal based on the status of the second input device 134 may then be communicated directly or indirectly to the actuator 130 to control operation of the mode selector unit 106. Alternatively or in addition, the mode selector unit 106 may automatically position the actuator 130 based on a vehicle attribute, such as vehicle speed. A control unit or controller may be provided to control operation of the actuator 130 or the supply of electrical current, pressurized fluid or other force to the actuator 130. The actuator 130 may then position or actuate the linkage 132 between a first position and a second position. In the first position, the linkage does not couple the second differential output shaft 116 to the connection output shaft 124. In the second position, the linkage 124 couples the second differential output shaft 116 to the connection output shaft 124.

Referring to FIGS. 2-6, operation modes of the transfer case 32 will now be discussed in more detail. In FIGS. 2-6, the curved arrows outside the transfer case 32 depict the direction of rotation of an input or output of the transfer case 32. In FIGS. 3-6, the arrowed lines inside the transfer case 32 depict the torque transfer path through the transfer case 32.

In FIG. 2, the transfer case 32 is shown in a neutral operation mode. In the neutral operation mode, the gear set selector unit 90 is in a neutral position in which neither the first gear set 60 nor the second gear set 62 is selected or engaged. For example, in the neutral operation mode the gear set selector unit 90 may not couple either the first gear 70 of the first gear set 60 or the third gear 80 of the second gear set 62 to the first shaft 50. As such, torque provided from the transmission 30 via the output shaft 34 to the input shaft or first shaft 50 of the transfer case 32 is not transmitted through the first or second gear sets 60, 62 to the output mode portion 44 or the vehicle traction wheels 24.

Figure 3:
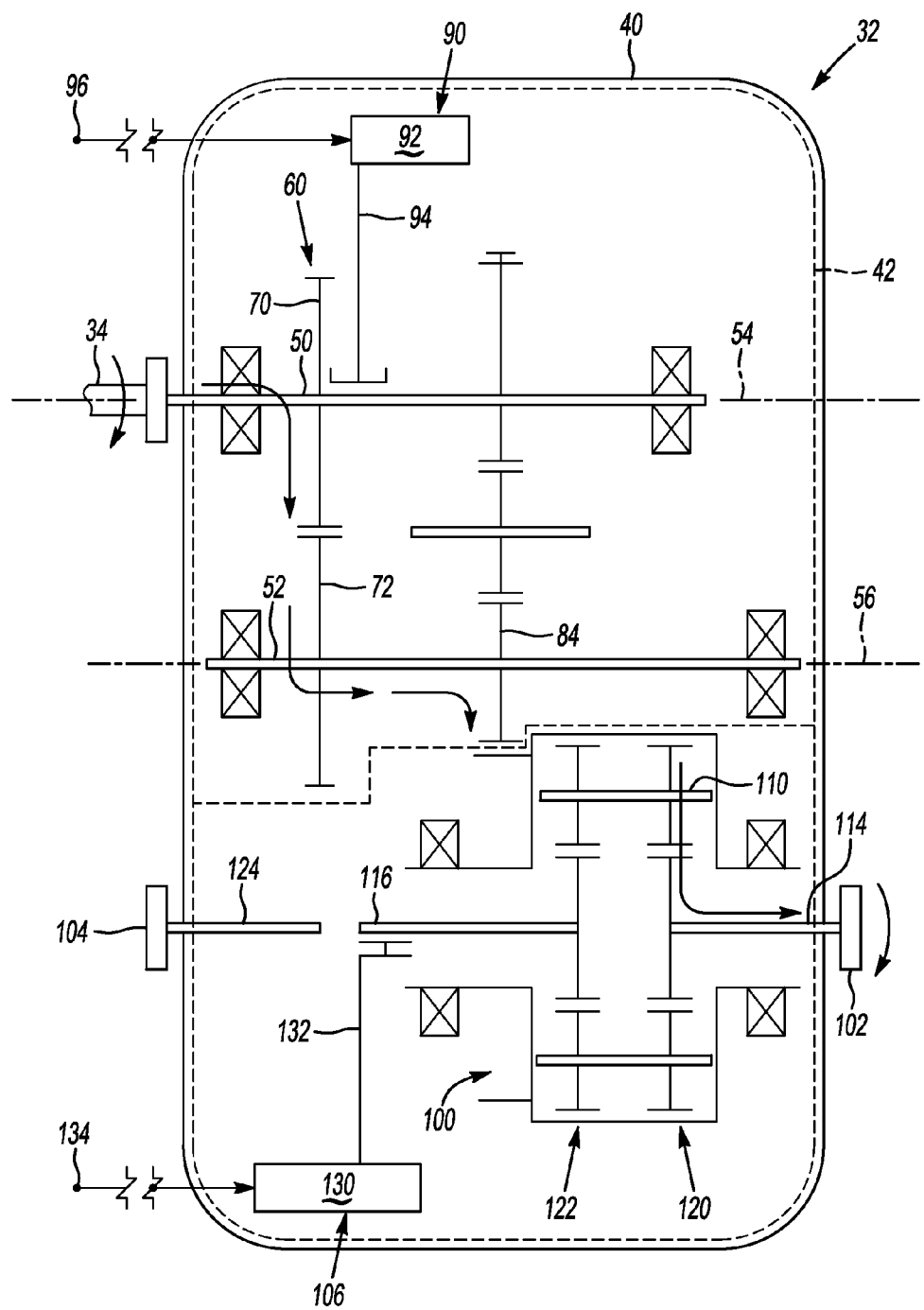
FIG. 3 is a schematic of the transfer case in a forward direction rear wheel drive operation mode.

In FIG. 3, the transfer case 32 is shown in a forward direction rear wheel drive operation mode. This mode may be selected when the vehicle is travelling at or above a predetermined speed, such as 15 miles per hour (24 km/h) in which the additional torque provided in a multi-wheel or all-wheel drive mode may not be desired. In this operation mode, the first gear set 60 is engaged and the second output 104 is not activated. More specifically, the gear set selector unit 90 is moved to a first position or forward position to engage the first gear 70 of the first gear set 60. Torque provided to the first shaft 50 via the output shaft 34 is transmitted through the first gear set 60 to the second shaft 52 and then via the fourth gear 84 to the differential 100. Operation of the differential 100 may then cause the first and second differential output shafts 114 and 116 to rotate. The mode selector unit 106 is positioned in a first position or disengaged position to physically disconnect the second differential output shaft 116 from the connection output shaft 124. As such, the first differential output shaft 114 may transmit torque to the first wheel set 26, but the second differential output shaft 116 does not transmit torque to the second wheel set 28.

Figure 4:
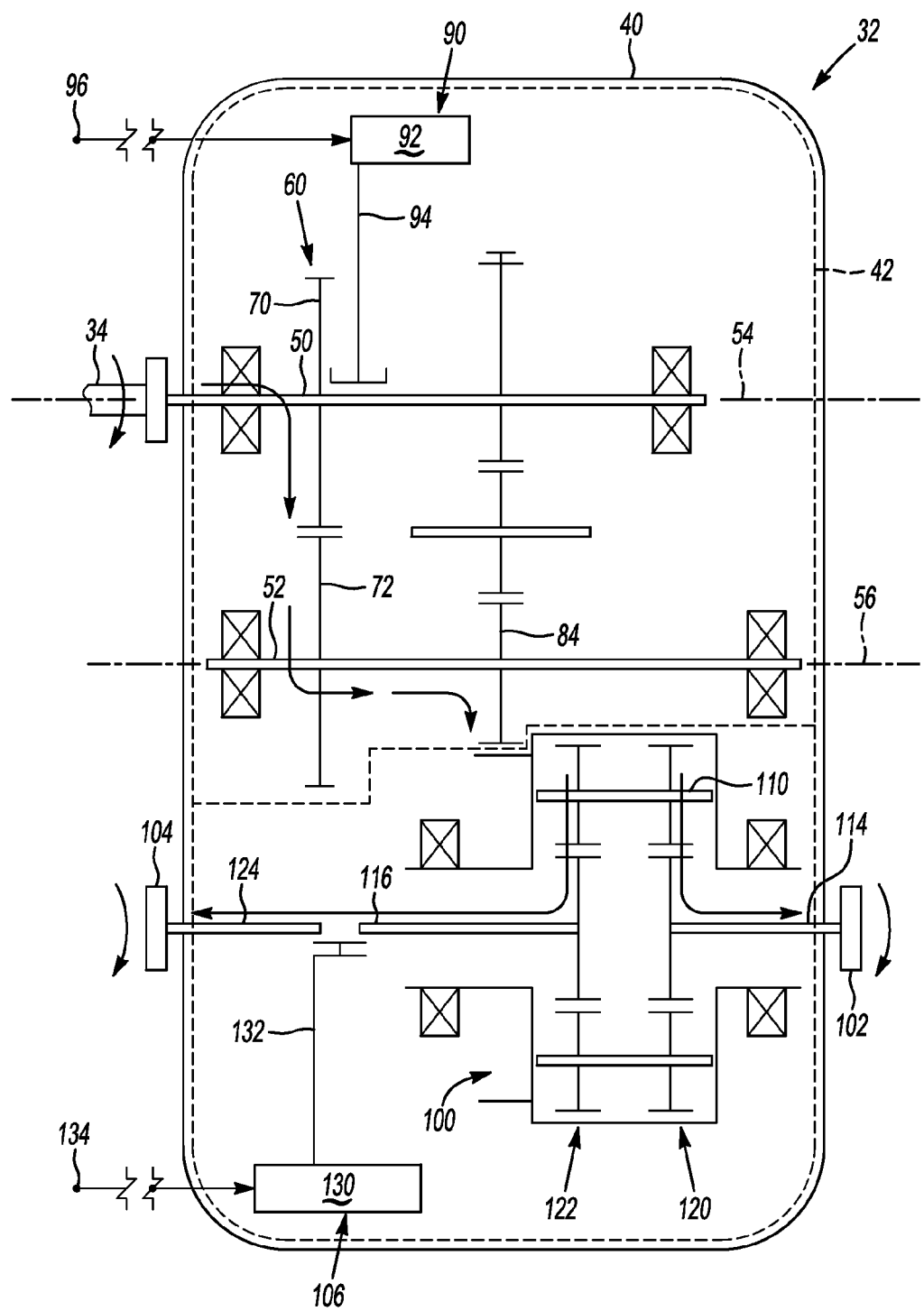
FIG. 4 is a schematic of the transfer case in a forward direction multi-wheel drive operation mode.

In FIG. 4, the transfer case 32 is shown in a forward direction multi-wheel or all-wheel drive operation mode. This mode may be engaged when the vehicle is operating below a predetermined speed, such as 15 miles per hour (24 km/h) to provide additional torque as compared to a rear wheel drive mode. In this operation mode, the first gear set 60 is engaged and the second output 104 is activated. More specifically, the gear set selector unit 90 engages the first gear 70 of the first gear set 60 and torque is provided to the differential 100 as described above in FIG. 3. Operation of the differential 100 causes the first and second differential output shafts 114 and 116 to rotate. The mode selector unit 106 is positioned in a second position or engaged position to physically couple the second differential output shaft 116 from the connection output shaft 124. As such, the first differential output shaft 114 may transmit torque to the first wheel set 26 and the second differential output shaft 116 may transmit torque to the second wheel set 28.

Figure 5:
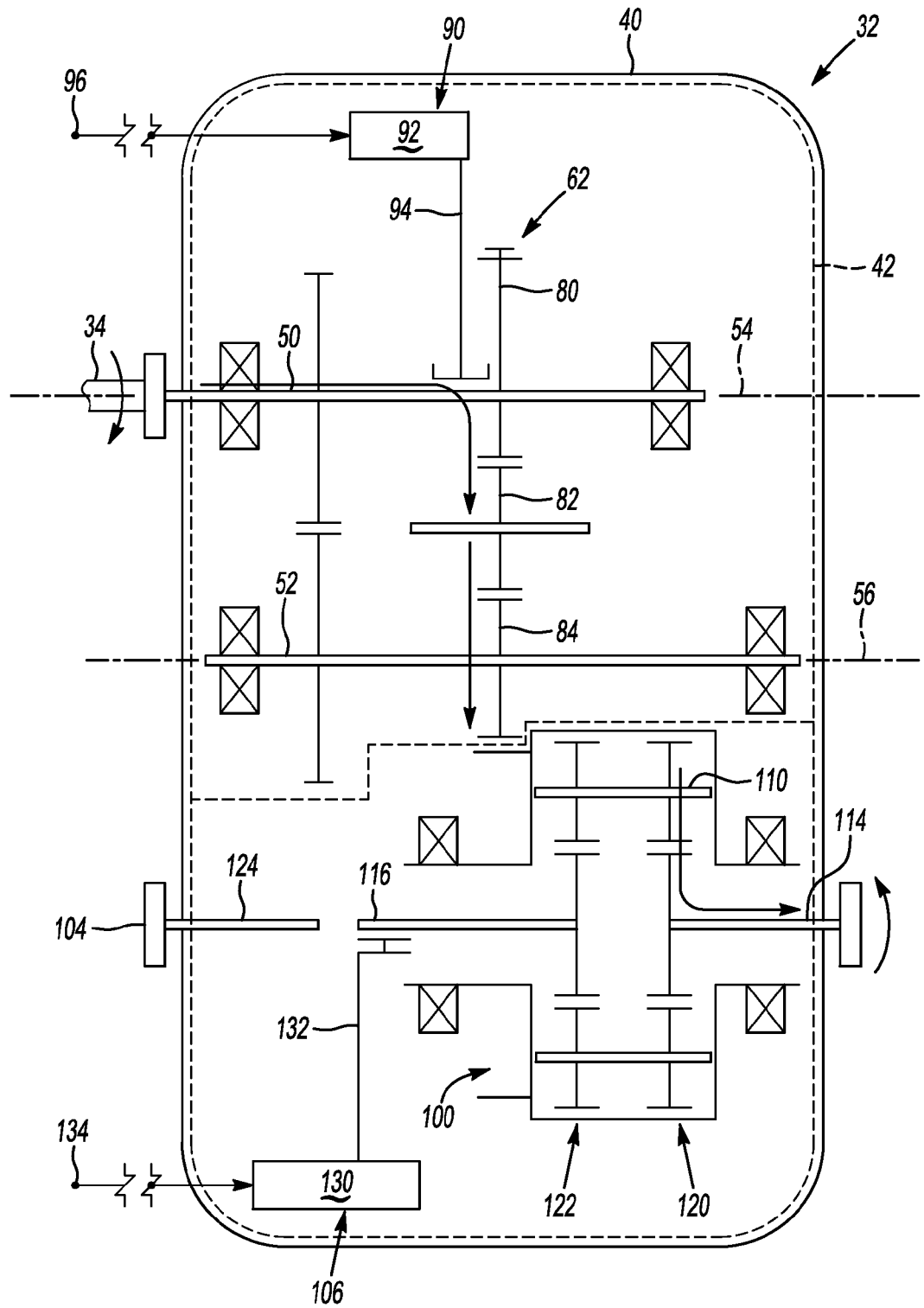
FIG. 5 is a schematic of the transfer case in a reverse direction rear wheel drive operation mode.

In FIG. 5, the transfer case 32 is shown in a reverse direction rear wheel drive operation mode. In this operation mode, the second gear set 62 is engaged and the second output 104 is not activated. More specifically, the gear set selector unit 90 is moved to a second position or reverse position to engage the third gear 80 of the second gear set 62. Torque provided to the first shaft 50 via the output shaft 34 is transmitted through the second gear set 62 to the second shaft 52 via the idler gear 82 and fourth gear 84 and then to the differential 100. Operation of the differential 100 causes the first and second differential output shafts 114 and 116 to rotate. Like FIG. 3, the mode selector unit 106 is positioned in the disengaged position to physically disconnect the second differential output shaft 116 from the connection output shaft 124. As such, the first differential output shaft 114 may transmit torque to the first wheel set 26, but the second differential output shaft 116 does not transmit torque to the second wheel set 28.

Figure 6:
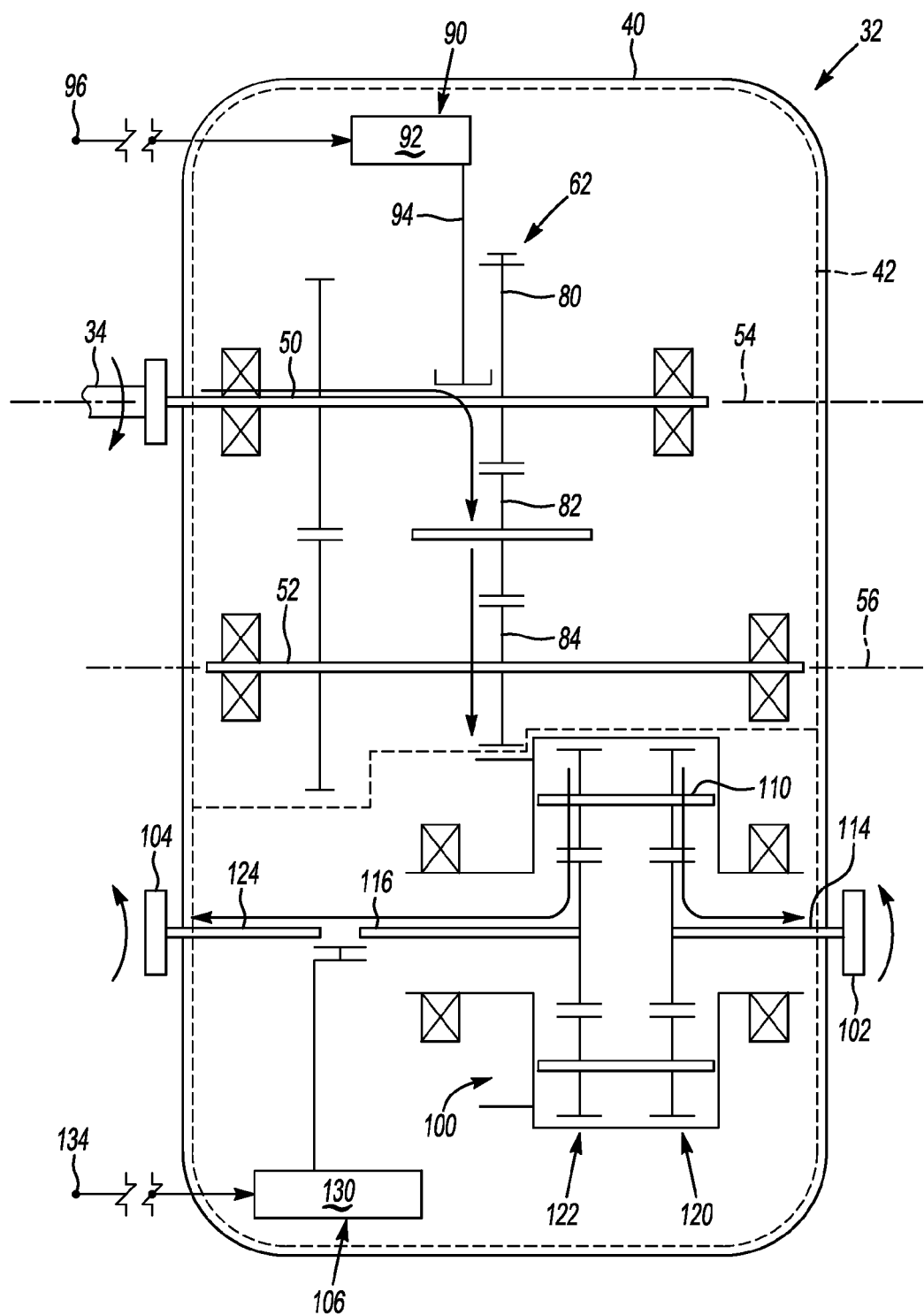
FIG. 6 is a schematic of the transfer case in a reverse direction multi-wheel drive operation mode.

In FIG. 6, the transfer case 32 is shown in a reverse direction multi-wheel or all-wheel drive operation mode. This mode may be a default mode such that full time all-wheel drive is provided when the reverse direction is selected or the cab is facing in a rear direction. In this operation mode, the second gear set 62 is engaged and the second output 104 is activated. More specifically, the gear set selector unit 90 is moved to a second position to engage the third gear 80 of the second gear set 62 is provided to the differential 100 as described above in FIG. 5. Operation of the differential 100 causes the first and second differential output shafts 114 and 116 to rotate. Like FIG. 4, the mode selector unit 106 is positioned in the engaged position to physically connect the second differential output shaft 116 from the connection output shaft 124. As such, the first differential output shaft 114 may transmit torque to the first wheel set 26 and the second differential output shaft 116 may transmit torque to the second wheel set 28.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transfer case comprising:
a rotation direction portion that includes:
an input shaft configured to receive an input torque;
first and second gear sets selectively coupled to the input shaft; and
a gear set selector unit configured to move between a forward position in which torque is transmitted through the first gear set and a reverse position in which torque is transmitted through the second gear set; and
an output mode portion configured to be driven by the rotation direction portion, the output mode portion including:
first and second outputs configured to provide an output torque; and
a mode selector unit disposed proximate the second output and configured to move between a first position and a second position;
wherein torque is transferred to the first and second outputs when the mode selector unit is in the second position.

2. The transfer case of claim 1 wherein torque is transferred to the first output but not the second output when the mode selector unit is in the first position.

3. The transfer case of claim 1 wherein the gear set selector unit is configured to move to a neutral position in which torque is not transmitted from the input shaft to the first and second gear sets.

4. The transfer case of claim 1 wherein torque is provided from the rotation direction portion to the output mode portion in a first rotational direction when torque is transmitted through the first gear set, the first rotational direction being the same as a rotational direction of the input shaft.

5. The transfer case of claim 4 wherein torque is provided from the rotation direction portion to the output mode portion in a second rotational direction that differs from the first rotational direction when torque is transmitted through the second gear set.

6. The transfer case of claim 1 wherein the gear set selector unit includes a first actuator and a first linkage that couples the input shaft to the first gear set when in the forward position and couples the input shaft to the second gear set when in the reverse position.

7. The transfer case of claim 6 further comprising a first input device for controlling positioning of the first actuator.

8. A transfer case for a vehicle, comprising:
a rotation direction portion that includes:
an input shaft configured to receive an input torque from a transmission;
first and second gear sets selectively driven by the input shaft; and
a gear set selector unit configured to move between a forward position in which torque is transmitted through the first gear set and a reverse position in which torque is transmitted through the second gear set; and
an output mode portion configured to be driven by the rotation direction portion, the output mode portion including:
first and second outputs configured to provide torque to first and second traction wheel sets, respectively; and
a mode selector unit disposed proximate the second output and configured to move between a first position and a second position;
wherein torque is transferred from the rotation direction portion to the output mode portion in a first rotational direction when the gear set selector unit is in the forward position and in a second rotational direction when the gear set selector unit is in the reverse position; and
wherein torque is transferred to the first output but not the second output when the mode selector unit is in the first position and the first and second outputs when the mode selector unit is in the second position.

9. The transfer case of claim 8 wherein torque is transmitted through the first gear set to provide torque to propel the vehicle in a forward direction.

10. The transfer case of claim 8 wherein torque is transmitted through the second gear set to provide torque to propel the vehicle in a reverse direction.

11. The transfer case of claim 8 wherein the mode selector unit is disposed in the first position when a vehicle speed exceeds a predetermined speed value.

12. The transfer case of claim 11 wherein the mode selector unit is disposed in the second position when the vehicle speed does not exceed a predetermined speed value.

13. The transfer case of claim 8 wherein the gear set selector unit is disposed in the first position when a driver is facing a first direction.

14. The transfer case of claim 8 wherein the gear set selector unit is disposed in the second position when a driver is facing a second direction.

15. The transfer case of claim 8 wherein the gear set selector unit is configured to move to a neutral position in which torque is not transmitted from the rotation direction portion to the output mode portion.

16. A transfer case for a vehicle, comprising:
a first shaft for receiving an input torque, the first shaft configured to rotate about a first axis of rotation;
a second shaft configured to rotate about a second axis of rotation;
first and second gear sets that selectively couple the first shaft and the second shaft, wherein the first and second shafts rotate in different directions when the first shaft drives the first gear set and wherein the first and second shafts rotate in the same direction when the first shaft drives the second gear set;
a differential that is driven by the second shaft, the differential having first and second differential output shafts; and
a connection output shaft selectively coupled to the second differential output shaft, wherein the second differential output shaft rotates the connection output shaft when coupled and does not rotate the connection output shaft when not coupled.

17. The transfer case of claim 16 wherein the first and second differential output shafts rotate in the same direction.

18. The transfer case of claim 16 further comprising a first linkage that is positionable between a forward position in which the input shaft rotates the first gear set but not the second gear set, a reverse position in which the input shaft rotates the second gear set but not the first gear set, and a neutral position in which the input shaft does not rotate the first or second gear sets.

19. The transfer case of claim 16 further comprising a second linkage that is positionable between an engaged position in which the linkage engages and rotatably couples the second differential output shaft and the connection output shaft and a disengaged position in which the linkage does not engage the second differential output shaft and the connection output shaft.

20. The transfer case of claim 16 wherein the first gear set has fewer gears than the second gear set.

* * * * *